United States Patent
Wang

(10) Patent No.: US 11,573,600 B2
(45) Date of Patent: Feb. 7, 2023

(54) DISPLAY DEVICE

(71) Applicant: BEIJING XIAOMI MOBILE SOFTWARE CO., LTD., Beijing (CN)

(72) Inventor: Lei Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 263 days.

(21) Appl. No.: 16/826,148

(22) Filed: Mar. 20, 2020

(65) Prior Publication Data

US 2021/0157363 A1 May 27, 2021

(30) Foreign Application Priority Data

Nov. 27, 2019 (CN) .......................... 201911184255.7

(51) Int. Cl.
*G06F 1/16* (2006.01)
*H04M 1/02* (2006.01)
*G06F 1/18* (2006.01)

(52) U.S. Cl.
CPC .......... *G06F 1/1635* (2013.01); *G06F 1/1601* (2013.01); *G06F 1/1626* (2013.01); *G06F 1/1637* (2013.01); *G06F 1/182* (2013.01); *H04M 1/026* (2013.01); *H04M 1/0266* (2013.01)

(58) Field of Classification Search
CPC ...... G06F 1/1635; G06F 1/1626; G06F 1/182; G06F 1/1601; G06F 1/1637; G06F 1/1656; G06F 1/16; H04M 1/026; H04M 1/0266
USPC ..................................... 361/679.02
See application file for complete search history.

(56) References Cited

U.S. PATENT DOCUMENTS

| | | | |
|---|---|---|---|
| 6,820,206 B1* | 11/2004 | Kim | G06F 1/263 324/426 |
| 9,612,622 B2* | 4/2017 | Moon | H02H 6/00 |
| 11,102,896 B1* | 8/2021 | Zhang | G09F 9/33 |
| 2006/0264197 A1* | 11/2006 | Mahini | H04M 1/72403 455/343.5 |
| 2011/0194230 A1* | 8/2011 | Hart | H04M 1/185 361/437 |

(Continued)

FOREIGN PATENT DOCUMENTS

| | | |
|---|---|---|
| CN | 101308708 A | 11/2008 |
| CN | 108040139 A | 5/2018 |

(Continued)

OTHER PUBLICATIONS

Supplementary European Search Report in the European application No. 20171273.4, dated Oct. 23, 2020.

(Continued)

*Primary Examiner* — Adrian S Wilson
*Assistant Examiner* — Gage Crum
(74) *Attorney, Agent, or Firm* — Syncoda LLC; Feng Ma

(57) ABSTRACT

A display device includes: a body, and a display screen portion detachably connected with the body. The body includes a first magnetic assembly; and the display screen portion includes a second magnetic assembly. At least one of the first magnetic assembly and the second magnetic assembly is a magnetic-field controllable assembly, and the first magnetic assembly and the second magnetic assembly are connected with or separated from one another due to magnetic attraction or repulsion respectively.

18 Claims, 13 Drawing Sheets

(56) References Cited

U.S. PATENT DOCUMENTS

| | | | |
|---|---|---|---|
| 2012/0154300 A1* | 6/2012 | Ma | G06F 3/038 |
| | | | 345/173 |
| 2016/0313768 A1* | 10/2016 | Shedletsky | H05K 5/06 |
| 2017/0092224 A1 | 3/2017 | Senda et al. | |
| 2018/0335804 A1 | 11/2018 | Liu et al. | |
| 2019/0052738 A1* | 2/2019 | Zeng | G06F 1/1652 |
| 2019/0166234 A1* | 5/2019 | Zeng | H04M 1/185 |
| 2019/0166235 A1* | 5/2019 | Zeng | H04M 1/0202 |
| 2020/0392759 A1* | 12/2020 | Morrison | G06F 1/1607 |

FOREIGN PATENT DOCUMENTS

| | | | | |
|---|---|---|---|---|
| CN | 108153024 A | 6/2018 | | |
| CN | 108831297 A | 11/2018 | | |
| EP | 3490228 A1 | 5/2019 | | |
| WO | 2014184610 A1 | 11/2014 | | |
| WO | WO-2014184610 A1 * | 11/2014 | | G06F 1/1643 |
| WO | 2016151211 A1 | 9/2016 | | |

OTHER PUBLICATIONS

First Office Action of the European application No. 20171273.4, dated Oct. 27, 2022.

\* cited by examiner

DISPLAY DEVICE

CROSS-REFERENCE TO RELATED APPLICATION

This application claims priority to Chinese Patent Application No. 201911184255.7 filed on Nov. 27, 2019, the disclosure of which is hereby incorporated by reference in its entirety.

BACKGROUND

Display devices, such as mobile phones, tablets and iPads, are widely used in people's work and life. A display screen portion for displaying images is an indispensable part of a display device.

SUMMARY

The present disclosure relates generally to the field of display devices, and more specifically to a display device.

The display device provided by the embodiments of the present disclosure includes: a body, and a display screen portion detachably connected with the body, wherein the body includes a first magnetic assembly; and the display screen portion includes a second magnetic assembly, wherein at least one of the first magnetic assembly and the second magnetic assembly is a magnetic-field controllable assembly, and the first magnetic assembly and the second magnetic assembly are connected with or separated from one another due to magnetic attraction or repulsion respectively.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
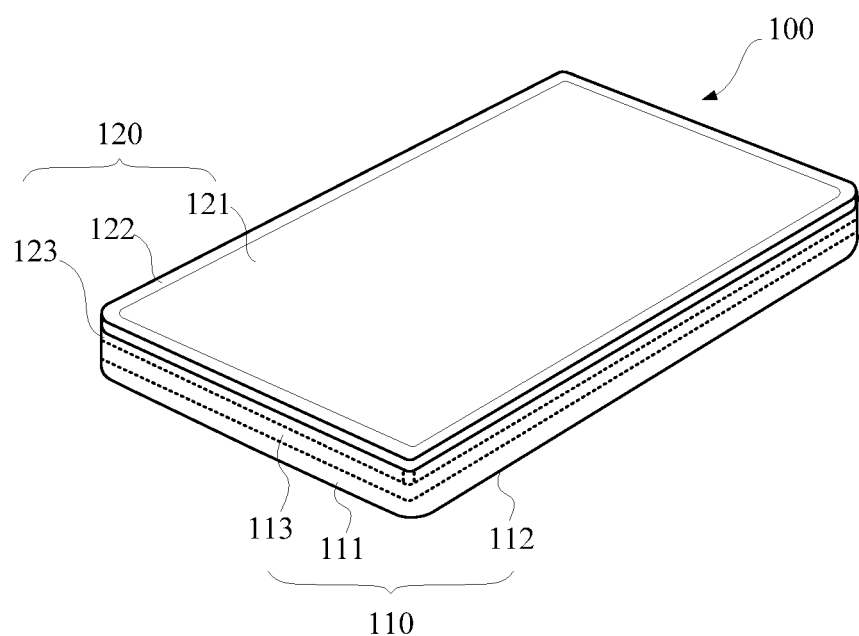
FIG. 1 is a schematic diagram showing a first working state of a display device according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The terminology used in this disclosure is for the purpose of describing particular embodiments only and is not intended to limit the disclosure. The technical or scientific terms used in this disclosure shall have the general meanings understood by those with general skills in the field to which this disclosure belongs, unless otherwise defined. The words of "first," "second," and the like used in this disclosure and the claims do not indicate any order, quantity, or importance, but are only used to distinguish different components. Similarly, the words of "a" or "one," and the like do not refer to quantitative restrictions, but to mean there is at least one. Unless otherwise specified, the words of "comprise" or "comprising" and the like mean that the components or objects appearing before the words "comprise" or "comprising" cover the components or objects appearing after the words "comprise" or "comprising" and their equivalents, and other components or objects are not excluded. And the words of "connected" or "connecting" and the like are not limited to physical or mechanical connections, and may include electrical connections, whether direct or indirect.

The singular forms such as "a," "the" and "this" used in the description and the appended claims are also intended to include the plural forms, unless the context clearly indicates other meanings. It should be also understood that the term "and/or" used herein refers to and includes any or all possible combinations of one or more associated listed items.

Display screen portions in display devices provided in existing techniques are difficult to be disassembled, which affects user experiences.

In some embodiments, the display screen portion of the display device is fixedly connected with the body of the display device, in this way, during replacement of the display screen portion, the connection between the display screen portion and the body will be damaged, which not only increases the cost of screen replacement for the display device, but also leads to poor user experiences.

Based on the foregoing, the display device is provided by the embodiments of the present disclosure. FIG. 1 to FIG. 13 are schematic structural diagrams of a display device according to some embodiments. It should be noted that the figures only use a mobile phone as an example for illustration, but in the embodiments of the present disclosure, the display device includes, but is not limited to, a mobile phone, a tablet computer, a wearable device (such as a smart watch, a bracelet), an on-board device, or a medical device.

Figure 2:
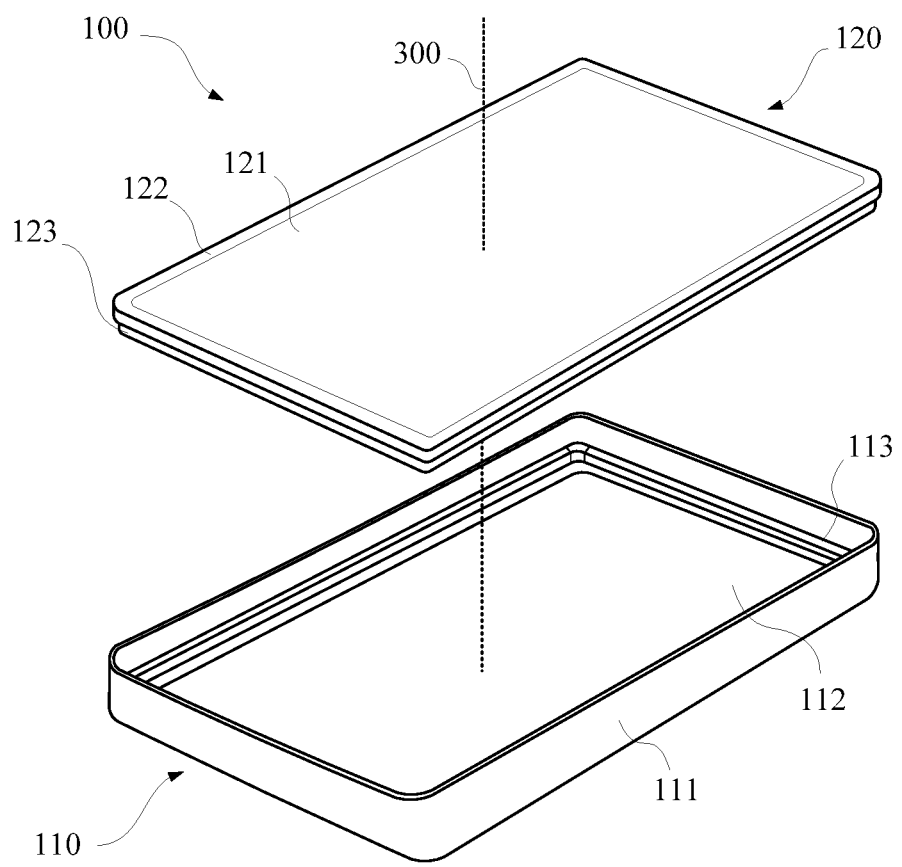
FIG. 2 is a schematic diagram showing a second working state of a display device according to some embodiments of the present disclosure.

As shown in FIG. 1 and FIG. 2, the display device 100 includes a body 110, and a display screen portion 120 detachably connected with the body 110. The words "detachably connected" means that the display screen portion 120 and the body 110 can be detached and connected without damaging their structures. Wherein, FIG. 1 is a schematic diagram showing a connection state of the body 110 and the display screen portion 120, FIG. 2 is a schematic diagram showing a separation state of the body 110 and the display screen portion 120.

The body 110 includes a frame 111 and a back cover 112 connected with the frame 111. The frame 111 and the back cover 112 enclose an open cavity for installing the battery, the controller, function modules and other components of the display device 100.

The display screen portion 120 includes a display screen 121, and a glass cover 122 covering a display surface of the display screen 121. The display screen 121 is selected from an LCD (Liquid Crystal Display) screen, an OLED (Organic Light-Emitting Diode) screen, or an LED (Light Emitting Diode) screen. And the display screen portion 120 is installed on an open surface of the body 110 to block the cavity of the body 110. The display surface of the display screen portion 120 is disposed facing the exterior of the cavity.

In some embodiments, the detachable connection between the body 110 and the display screen portion 120 is implemented by the magnetic field. Specifically, the body 110 further includes a first magnetic assembly 113 and the display screen portion 120 further includes a second magnetic assembly 123. At least one of the first magnetic assembly and the second magnetic assembly is a magnetic-field controllable assembly. The magnetic-field controllable assembly may change its own magnetic field strength and magnetic pole direction (for example, to reverse the magnetic south pole and magnetic north pole). With the magnetic-field controllable assembly, the first magnetic assembly 113 and the second magnetic assembly 123 can be connected with or separated from one another due to magnetic attraction or repulsion respectively.

According to some embodiments of the present disclosure, magnetic poles of the first magnetic assembly 113 are arranged to be opposite to magnetic poles of the second magnetic assembly 123. In this way, the attraction or repulsion effect of the first magnetic assembly 113 and the second magnetic assembly 123 is optimized.

Figure 3:
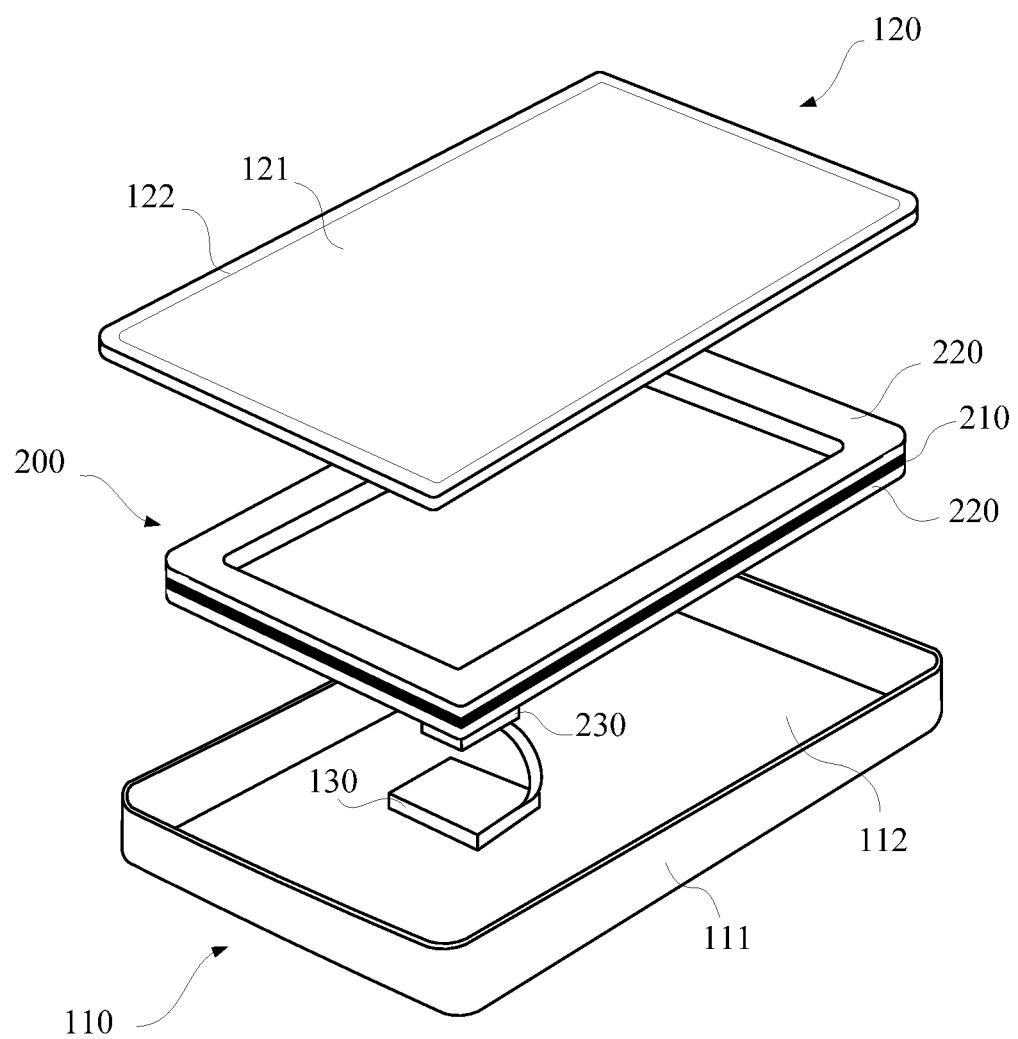
FIG. 3 is a schematic diagram showing relative positions of a magnetic-field controllable assembly, a display screen portion and a body of a display device according to some embodiments of the present disclosure.

In the embodiments of the present disclosure, FIG. 3 to FIG. 7 provide an implementation method of a magnetic-field controllable assembly 200. As shown in FIG. 3 and combined with FIG. 2, the magnetic-field controllable assembly 200 includes a ferromagnetic core 210 disposed around a set axis 300 (for example, the ferromagnetic core 210 has an annular structure). Moreover, the set axis 300 is perpendicular to the display surface of the display screen portion 120 when the body 110 and the display screen portion 120 are connected.

The magnetic-field controllable assembly 200 further includes a coil 220 wound around the ferromagnetic core 210. When the body 110 is connected with the display screen portion 120, the coil 220 is surrounding the ferromagnetic core 210 with the set axis 300 as an axis. According to some embodiments of the present disclosure, the coil 220 may be annularly attached to the ferromagnetic core 210.

Figure 4:
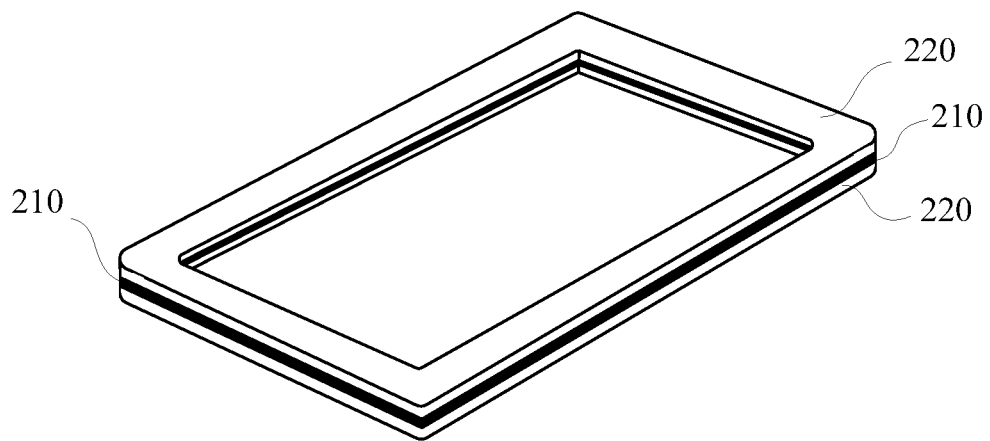
FIG. 4 is a first schematic structural diagram of a magnetic-field controllable assembly of a display device according to some embodiments of the present disclosure.
Figure 5:
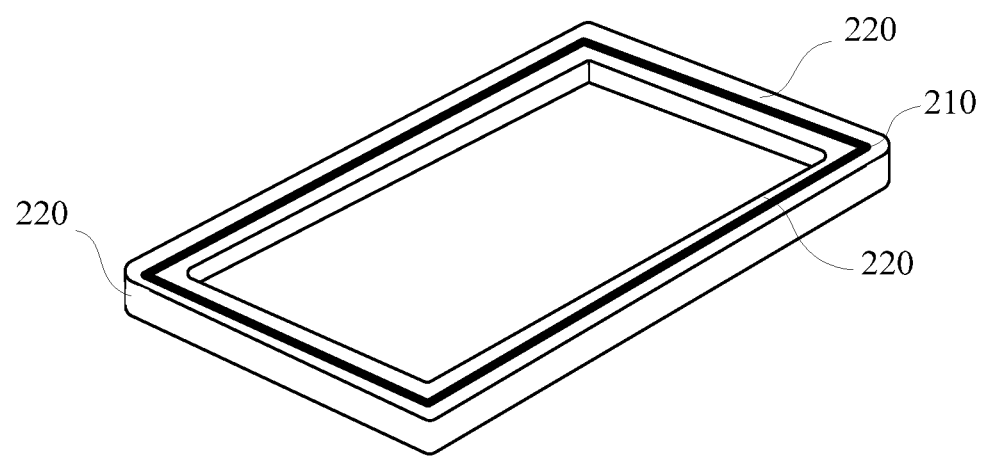
FIG. 5 is a second schematic structural diagram of a magnetic-field controllable assembly of a display device according to some embodiments of the present disclosure.

For example, as shown in FIG. 4, the coil 220 is disposed above and below the ferromagnetic core 210.

For example, as shown in FIG. 4, the coil 220 is disposed on the inner and outer peripheral sides of the ferromagnetic core 210.

Of course, the coil 220 may also be disposed in other ways, as long as it can ensure that the magnetic field excited by the coil 220 under the action of the current can realize the interaction between the first magnetic assembly 113 and the second magnetic assembly 123.

The magnetic-field controllable assembly 200 further includes a charging module (including a charging circuit) 230 electrically connected with the coil 220. The charging module 230 can provide the coil 220 with a first current I1 or a second current I2, wherein current directions of the first current I1 and the second current I2 are opposite.

Figure 6:
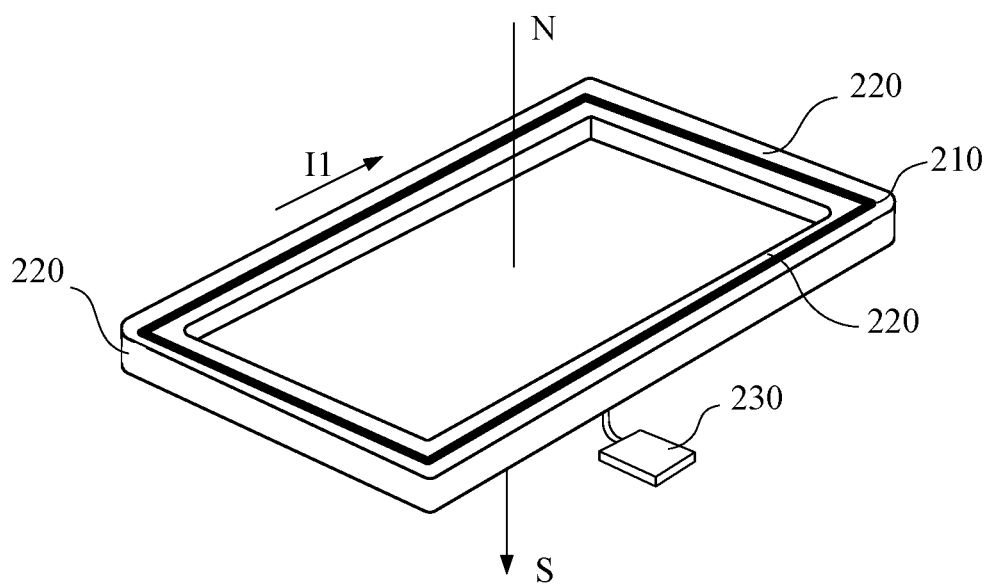
FIG. 6 illustrates a first working principle diagram of a magnetic-field controllable assembly of a display device according to some embodiments of the present disclosure.

As shown in FIG. 6, the coil 220 excites the first magnetic field, when the charging module 230 outputs the first current I1 to the coil 220. And the ferromagnetic core 210 is magnetic when magnetized by the first magnetic field, and the magnetic pole distribution is the same as that of the first magnetic field. Taking the orientation shown in FIG. 6 as an example, the north (N) pole of the ferromagnetic core 210 is on the top and the south (S) pole of the ferromagnetic core is on the bottom. In combination with the orientation shown in FIG. 3, since the axial direction of the ferromagnetic core 210 and the coil 220 coincides with the separation direction of the display screen portion 120 and the body 110, the N pole of the ferromagnetic core 210 is at the display screen portion 120 side, and the S pole is at the body 110 side.

Figure 7:
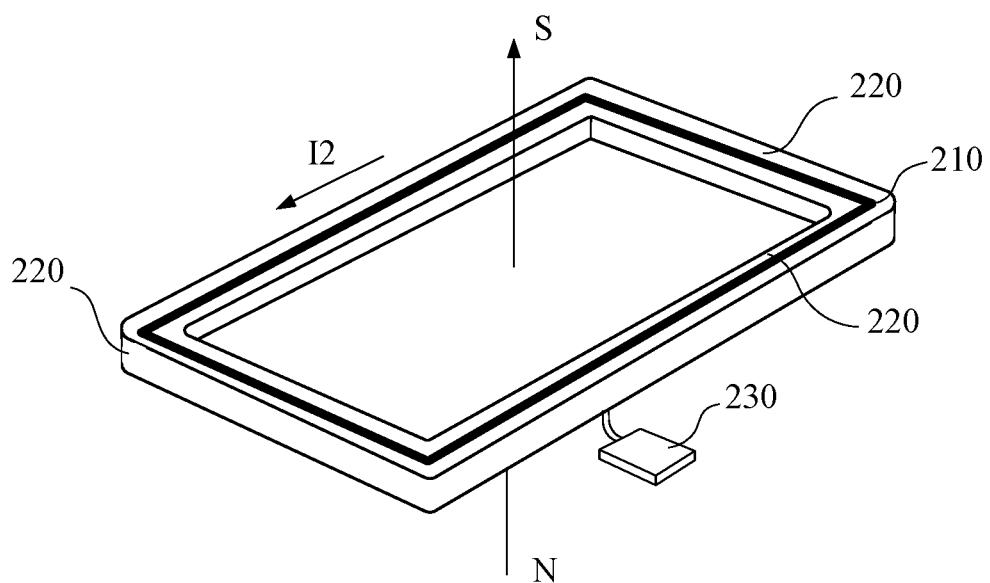
FIG. 7 illustrates a second working principle diagram of a magnetic-field controllable assembly of a display device according to some embodiments of the present disclosure.

As shown in FIG. 7, the coil 220 excites the second magnetic field, when the charging module 230 outputs the second current I2 for the coil 220. And the ferromagnetic core 210 is magnetic when magnetized by the second magnetic field, and the magnetic pole distribution is the same as that of the second magnetic field. However, the current directions of the first current I1 and the second current I2 are opposite, thus the magnetic pole distributions of the first magnetic field and the second magnetic field are also opposite. Taking the orientation shown in FIG. 7 as an example, herein, the N pole of the ferromagnetic core 210 is on the bottom and the S pole of the ferromagnetic core is on the top. In combination with the orientation shown in FIG. 3, the S pole of the ferromagnetic core 210 is at the display screen portion 120 side, and the N pole is at the body 110 side.

The first current I1 or the second current I2 is provided to the coil 220 through the charging module 230 to change the magnetic pole distribution of the magnetic-field controllable assembly 200. In this way, the connection and separation between the first magnetic assembly 113 and the second magnetic assembly 123 can be realized by using the principle of opposite pole attraction and like pole repulsion. Further, the detachable connection between the body 110 and the display screen portion 120 is also implemented by this way. Furthermore, the way to realize the connection and separation through the action of a magnetic field, ensures the structural integrity of the body 110 and the display screen portion 120, prevents damage during the disassembly and installation process, and optimizes user experiences.

Referring to FIG. 3, a controller 130 electrically connected with the charging module 230 is also provided in the body 110. The controller 130 can control the charging module to output the first current I1 or the second current I2, in response to an operation triggering separation or triggering connection between the display screen portion 120 and the body 110.

In the embodiments of the present disclosure, there is no specific limitation on the way for acquisition of the operation triggering separation or triggering connection between the display screen portion 120 and the body 110, herein the acquisition way includes, but is not limited to: acquisition by a triggering key (physical key or virtual key), acquisition by recognition of a voice command, acquisition by monitoring preset motion parameters (such as rotation angle, moving speed in specified direction, etc.).

With regard to the implementation of the first magnetic assembly 113 and the second magnetic assembly 123, according to some embodiments, both of the first magnetic assembly 113 and the second magnetic assembly 123 are the magnetic-field controllable assembly 200. According to some embodiments, one of the first magnetic assembly 113 and the second magnetic assembly 123 is the magnetic-field controllable assembly 200, and another one is a permanent magnet.

In the embodiments of the present disclosure, the first magnetic assembly 113 is the magnetic-field controllable assembly 200, and the second magnetic assembly 123 is a permanent magnet. In this way, on the premise of realizing the detachable connection between the body 110 and the display screen portion 120, the production difficulty and cost of the overall display device 100 are reduced due to the characteristics of simple structure and easy installation of the permanent magnet. Particularly, the use of permanent magnet reduces the structural complexity of the display screen portion 120, such that the display screen portion 120 is easy to package and thus the appearance of the display screen portion 120 is beautified.

Figure 8:
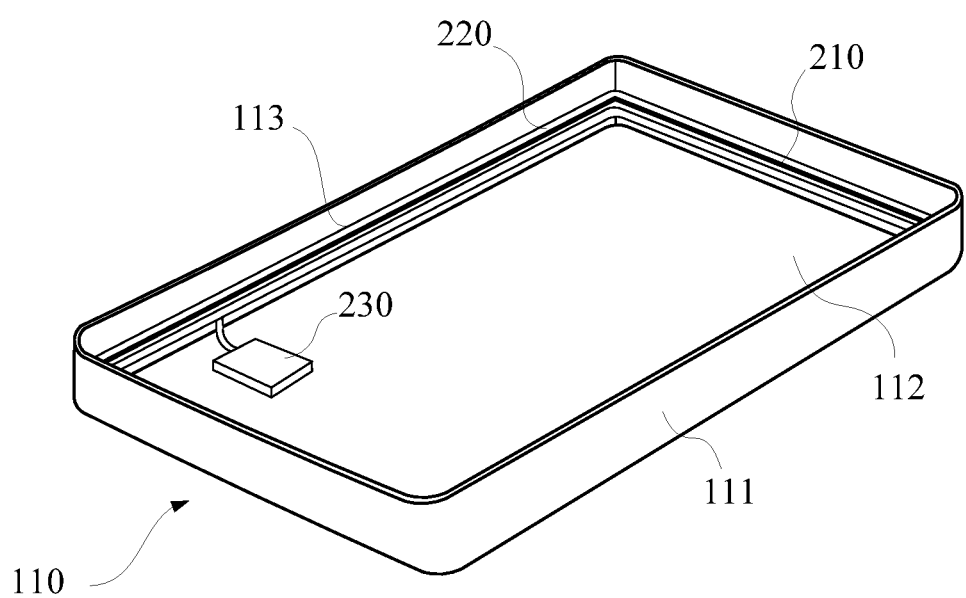
FIG. 8 is a schematic structural diagram of a body of a display device according to some embodiments of the present disclosure.

As shown in FIG. 8, the first magnetic assembly 113 is disposed on the inner wall of the frame 111 of the body 110. The first magnetic assembly 113 is the magnetic-field controllable assembly 200. Herein, the ferromagnetic core 210 and the coil 220 are disposed along an inner wall of the frame 111. For example, the ferromagnetic core 210 and the coil 220 are attached to the inner wall of the frame 111. Moreover, the charging module 230 of the first magnetic assembly 113 is disposed within the body 110, and connected with the coil 220 through pins or flexible circuit board(s).

Figure 9:
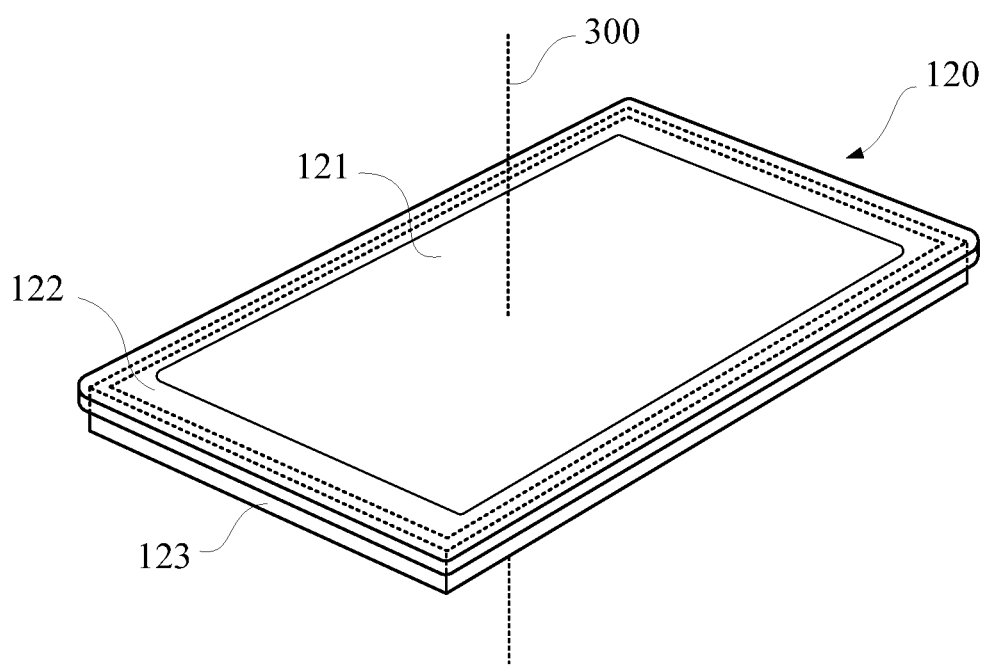
FIG. 9 is a schematic structural diagram of a display screen portion of a display device, according to some embodiments of the present disclosure.

As shown in FIG. 9 and combined with FIG. 2, the second magnetic assembly 123 is disposed on one side of the display screen portion 120 facing the body 110.

According to some embodiments of the present disclosure, as shown in FIG. 9, the cover 122 of the display screen portion 120 is disposed beyond the edge of the display screen 121. The second magnetic assembly 123 and the display screen 121 are located on the same side of the cover 122, and the second magnetic assembly 123 is disposed on a portion of the cover 122 beyond the display screen 121.

According to some embodiments of the present disclosure, the second magnetic assembly 123 is disposed on a back side of the display screen 121. The back side of the display screen 121 is a side opposite to the display surface of the display screen 121 (this scheme is not shown in FIG. 9).

The second magnetic assembly 123 is a permanent magnet and disposed around the set axis 300. The set axis 300 is parallel with the separation direction of the display screen portion 120 and the body 110.

Exemplarily, the second magnetic assembly 123 is an annular permanent magnet attached to the display screen portion 120 (for example, as shown in FIG. 9), and the axis of the annular permanent magnet is parallel with the set axis 300. For example, the second magnetic assembly 123 includes multiple permanent magnets (not shown in FIG. 9). The multiple permanent magnets are attached to the display screen portion 120 in an annular manner, and the axis of the annulus formed by the multiple permanent magnets is parallel to the set axis 300.

In some embodiments, the ferromagnetic core 210 of the first magnetic assembly 113 is arranged to be opposite to the permanent magnet of the second magnetic assembly 123. In this way, the first magnetic assembly 113 is closely connected with the second magnetic assembly 123, when the body 110 is connected with the display screen portion 120.

Figure 10:
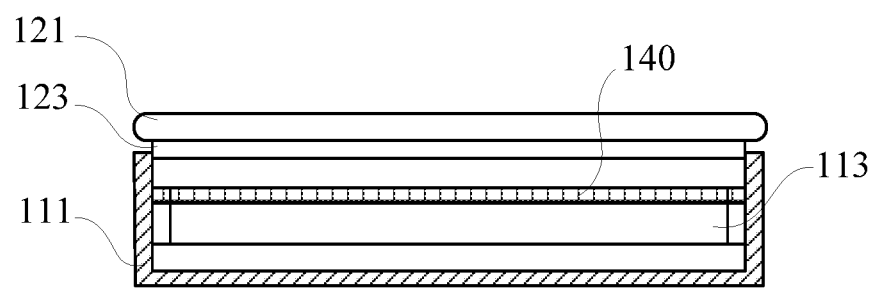
FIG. 10 is a first schematic diagram showing setting modes of an elastomeric seal of a display device according to some embodiments of the present disclosure.
Figure 11:
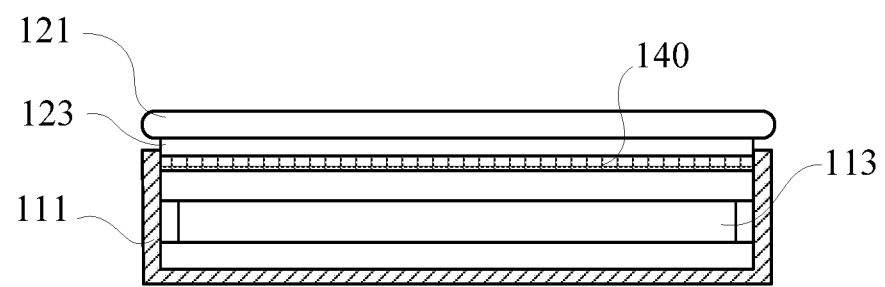
FIG. 11 is a second schematic diagram showing setting modes of an elastomeric seal of a display device according to some embodiments of the present disclosure.

Further, as shown in FIGS. 10 and 11, an elastomeric seal 140 is provided within the body 110. The elastomeric seal 140 is disposed between attracted connection surfaces of the first magnetic assembly 113 and the second magnetic assembly 123 when the body 110 and the display screen portion 120 are connected. Wherein, the elastomeric seal 140 is an elastomeric sealing ring or an elastomeric sealing strip. According to some embodiments of the present disclosure, the elastomeric seal 140 is made from foam, silicone, and other materials. The structural tightness of the body 110 and the display screen portion 120 is improved by the elastomeric seal 140 to ensure the use security of the display device 100.

According to some embodiments of the present disclosure, as shown in FIG. 10, the elastomeric seal 140 is disposed within the body 110 and covers one side of the first magnetic assembly 113 facing the display screen portion 120 (for example, the first magnetic assembly 113 has an annular structure, and the elastomeric seal 140 covers an annular surface of the first magnetic assembly 113 facing the display screen portion 120). According to some embodiments of the present disclosure, as shown in FIG. 11, the elastomeric seal 140 is disposed on the display screen portion 120, and covers the permanent magnet of the second magnetic assembly 123.

In some embodiments, a motion sensor is provided within the body 110, which is configured to detect a motion parameter of the display device 100 along a vertical direction. For example, the motion sensor is configured to detect the velocity and/or acceleration of the display device 100 along a vertical direction. Moreover, the controller 130 is electrically connected with the motion sensor, and in response to that the motion parameter along the vertical direction, which is detected by the motion sensor, rises to a preset threshold, the controller is configured to control the charging module 230 to reduce an intensity of an output current.

When the motion parameter along the vertical direction, which is detected by the motion sensor, rises to a preset threshold (for example, the velocity and/or acceleration of the display device 100 rises to a preset threshold), it indicates that the display device 100 is in a falling state.

In addition, the magnetic field strength of the magnetic-field controllable assembly 200 is positively related to the strength of the current in the coil 220. Therefore, controlling the charging module 230 to reduce the strength of the output current can weaken the magnetism of the magnetic-field controllable assembly 200, which thus reduces the combination tightness of the first magnetic assembly 113 and the second magnetic assembly 123. It should be noted that the reduced current output by the charging module 230 satisfies the requirement that the magnetic field excited by the coil can still maintain the connection between the body 110 and the display screen portion 120, then the structural security of the display device 100 can be ensured.

In this case, when the display device 100 falls, the controller 130 controls the charging module 230 to reduce the strength of the output current, such that deformation of the elastomeric seal 140, which is resulted from the press by the first magnetic assembly 113 and the second magnetic assembly 123, reduces. Further, when the display device 100 decelerates or touches the ground, the elastomeric seal 140 can be further compressed to play a buffering role and realize the anti-falling effect, which can ensure the structural integrity of the display screen portion 120.

Figure 12:
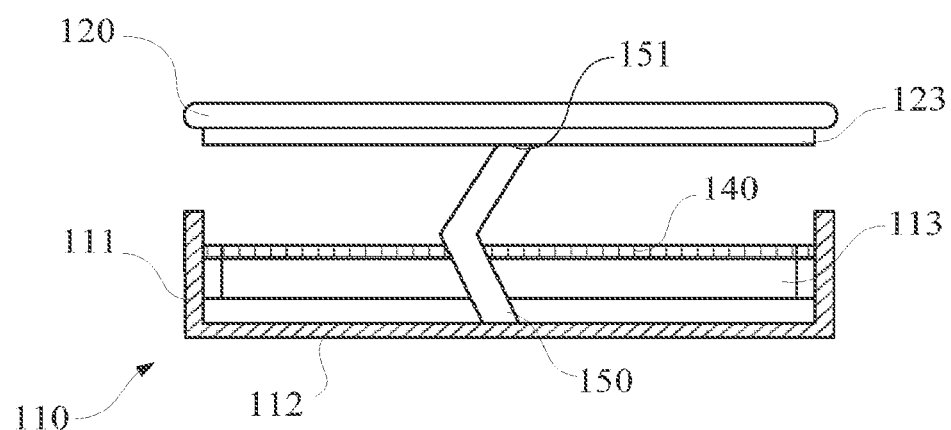
FIG. 12 is a schematic structural diagram of a display device according to some embodiments of the present disclosure.

In some embodiments, as shown in FIG. 12, the display device 100 further includes a movable connecting arm 150, wherein one end of the movable connecting arm 150 is disposed within the body 110, and the other end of the movable connecting arm 150 is connected with the display screen portion 120. The movable connecting arm 150 is telescopic relative to the body 110, for example, the movable connection arm 150 is a telescopic movable connection arm.

The controller 130 of the display device 100 is electrically connected with the movable connecting arm 150, and the controller 130 is configured to control the movable connecting arm 150 to drive the display screen portion 120 to eject from the body 110, in response to an operation triggering separation between the display screen portion 120 and the body 110. As a preferred solution, the controller 130 preferentially controls the charging module 230 of the magnetic-field controllable assembly 200, and then actuates the movable connecting arm 150, after the first magnetic assembly 113 mutually magnetically repels with the second magnetic assembly 123.

The controller 130 can control the movable connecting arm 150 to drive the display screen portion 120 to retract to the body 110, in response to the operation triggering connection between the display screen portion 120 and the body 110. As a preferred solution, the controller 130 preferentially controls the charging module 230 of the magnetic-field controllable assembly 200, and then actuates the movable connecting arm 150, after the first magnetic assembly 113 mutually magnetically attracts with the second magnetic assembly 123.

According to some embodiments of the present disclosure, the display device 100 is provided with a movable connecting arm 150, which is connected with one side of the display screen portion 120 facing the interior of the body 110. According to some embodiments of the present disclosure, the display device 100 is provided with at least two movable connecting arms 150, and the joints 151 of the movable connecting arms 150 and the display screen portion 120 are evenly distributed on one side of the display screen portion 120 facing the interior of the body 110. In this way, it is ensured that the movable connecting arm 150 acts stably on the display screen portion 120.

In some embodiments, when the display device 100 is in use, it is difficult for the display device 100 to maintain stable due to the influence from external environment. For example, the display device 100 frequently shakes during use due to the influence of the vehicle speed and road conditions when the user is traveling on a train, car, or other means of transportation, which results in visual fatigue and even dizziness for the user, thus affecting user experiences.

In view of the above problems, the embodiments of the present disclosure provide the following solutions. In some embodiments, the display device 100 includes a motion sensor to detect a motion parameter of the body 110.

Figure 13:
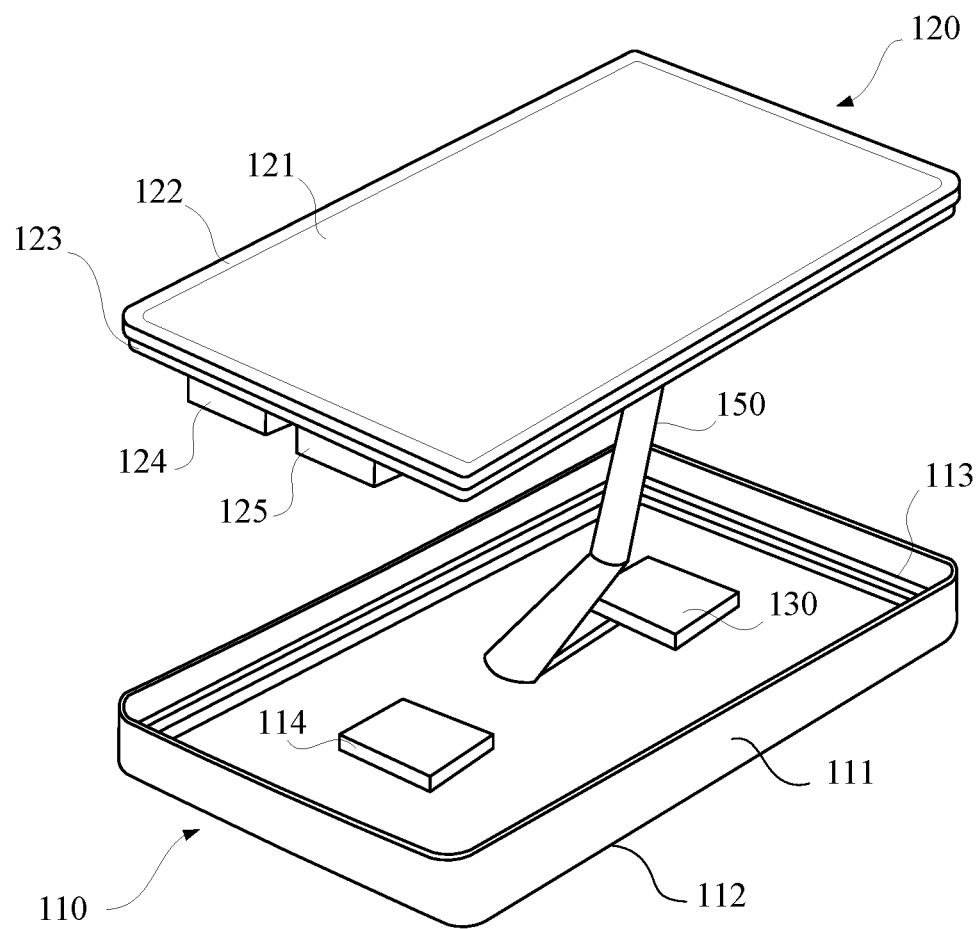
FIG. 13 is a schematic structural diagram of a display device according to some other embodiments of the present disclosure.

The body has six degrees of freedom of motion during use. As shown in FIG. 13, the six degrees of freedom of motion of the body 110 include the degrees of freedom of translation along the positive and negative directions of the x-axis, y-axis, and z-axis, as well as the degrees of freedom of rotation around the x-axis, y-axis, and z-axis as axes.

Herein, according to some embodiments of the present disclosure, the x-axis, y-axis, and z-axis use the display device 100 as a reference body, the plane formed by the x-axis and the y-axis is the surface on which the display surface of the display screen portion 120 locates, and the z-axis is perpendicular to the display surface of the display screen portion 120. According to some embodiments of the present disclosure, the x-axis, y-axis, and z-axis use the ground as a reference body, the plane formed by the x-axis and the y-axis is the horizontal plane, and the z-axis is distributed in the vertical direction. In this case, the body 110 can move freely in space under external forces.

According to some embodiments of the present disclosure, the motion sensor is configured to detect the motion parameter of the body 110 in each of six degrees of freedom of motion. The motion parameters include, but are not limited to, the velocity, acceleration, or rotation angle of the body 110.

In the display device 100, the controller is electrically connected with the charging module, and when the display screen portion 120 is magnetically separated from the body 110 due to magnetic repulsion, the controller 130 receives the motion parameters detected by the motion sensor. In addition, the controller 130 determines the current motion state of the body 110 according to the motion parameters of the body 110 received by the motion sensor. For example, when the motion amplitude and a motion frequency of the body 100 are within respective preset threshold ranges, the controller 130 determines that the body 110 is currently in a shaking state.

Moreover, in the embodiments of the present disclosure, with the end of the movable connecting arm connected with the display screen portion as a reference, the end of the movable connecting arm disposed within the body has six degrees of freedom of motion. In this case, when the controller 130 determines that the motion amplitude and motion frequency of the body 110 are within respective preset threshold ranges, the controller 130 controls, according to the motion parameters of the body 110 that are obtained by the motion sensor, the movable connecting arm 150 to drive the display screen portion 120 to move backwards relative to the body 110.

In this way, the display screen portion 120 is always located in a preset region. And in this preset region, the display screen portion 120 remains stable relative to the user.

As a preferred solution, the maximum shaking amplitude of the display screen portion 120 within the preset region is less than or equal to 5 mm. Accordingly, the movable connecting arm 150 is used to prevent the display screen portion 120 from being affected by the movement of the body 110. In this case, when the display device 100 is used, the display screen portion 120 is always in a relatively stable state for the user. Its vibration amplitude is very small or even hard to detect by the human eye, which optimizes the user experience and plays an anti-shaking effect.

In addition, the display screen portion 120 is provided with an independent power supply assembly, and the display screen portion 120 is communicatively connected with the controller 130 within the body 110. Accordingly, the display screen portion 120 receives power from the independent power supply assembly after the display screen portion 120 is separated from the body 110, and the display screen portion 120 receives a display instruction sent by the controller 130. In this way, an image can still be displayed, after the display screen portion 120 is separated from the body 110.

Herein, the movable connecting arm 150 may optionally adopt an anti-shaking head mechanism. It should also be noted that, in this embodiment, the display device 100 preferably uses only one movable connecting arm 150 to maintain the stability of the display screen portion 120 in six degrees of freedom of motion.

In some embodiments, as shown in FIG. 13, the display screen portion further includes a data transceiver 124 and a first power supply 125.

Herein, the data transceiver 124 is communicatively connected with the controller 130 within the body 110. For example, the data transceiver 124 is wirelessly connected to the communication module in the controller 130, where the method for wireless connection includes, but is not limited to, Bluetooth, WI-FI (Wireless Fidelity, wireless local area network based on IEEE 802.11b), and ZigBee wireless transmission technology. Moreover, the data transceiver 124 and the display screen portion 120 adopt a data connection, for example, the data transceiver 124 is connected to the control chip of the display screen portion 120 through a cable or a flexible circuit board.

The first power supply 125 is connected with the display screen portion 120 and the data transceiver 124, so as to supply power to the display screen portion 120 and the data transceiver 124.

In this case, when the display screen portion 120 is separated from the body 110, the display information sent by the controller 130 is sent to the control chip of the display screen portion 120 through the data transceiver 124, the display screen portion 120 can thus display a preset image corresponding to the display information. In this way, the display screen portion 120 can be used normally, even separated from the body 110. With the display device 100, the independent use of the display screen portion 120 can be realized. Furthermore, compared with the whole display device 100, the display screen portion 120 is thinner and narrower, so that its user will have excellent grip feel and optimized user experiences.

Further, the body 110 also includes a second power supply 114 module that mates with the first power supply 125 to charge the first power supply 125.

Exemplarily, the first power supply 125 and the second power supply 114 are connected through contacts. When the display screen portion 120 is connected with the body 110, the contacts of the first power supply 125 and the contacts of the second power supply 114 abuts against each other to implement charging.

Exemplarily, the first power supply 125 and the second power supply 114 are wirelessly charged. For instance, the first power supply 125 includes a first charging coil, and the second power supply 114 includes a second charging coil. When the display screen portion 120 is aligned with the open surface of the cavity of the body 110 and the distance between the display screen portion 120 and the body 110 does not exceed a preset threshold, the first charging coil mates with the second charging coil to implement charging.

In addition, according to some embodiments of the present disclosure, the battery capacity information is shown on the display surface of the display screen portion 120. When the display screen portion 120 is separated from the body 110 and the battery capacity of the first power supply 125 is lower than a preset threshold, the display screen portion 120 displays a connection prompt. The connection prompt indicates that the display screen portion 120 needs to be connected with the body 110 so as to be powered by the second power supply 114.

The display device 100 provided by the embodiments of the present disclosure has a detachable body 110 and a display screen portion 120, which are convenient for disassembly and maintenance, and for replacement of components. Furthermore, based on the characteristics of detachable connection between the body 110 and the display screen portion 120, the anti-shaking effect is achieved by the movable connecting arm 150; and the independent use of the display screen portion 120 can be achieved with the configuration of the data transceiver 124, the first power supply 125 and the second power supply 114, thereby optimizing user experiences.

The display device provided by various embodiments of the present disclosure can have one or more of the following advantages.

The connection between the body and the display screen portion is implemented through the attraction between opposite magnetic fields of the first magnetic assembly and the second magnetic assembly; furthermore, the separation between the body and the display screen portion is implemented through the repulsion between like magnetic fields of the first magnetic assembly and the second magnetic assembly. The display device provided by the embodiments of the present disclosure has detachably connected body and display screen portion, thus the display screen portion is convenient for disassembly and installation while assuring the structural integrity of the body and the display screen portion, thereby optimizing user experiences.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display device, comprising: a body, and a display screen portion detachably connected with the body,
wherein the body comprises a first magnetic assembly; and
the display screen portion comprises a second magnetic assembly,
wherein at least one of the first magnetic assembly and the second magnetic assembly is a magnetic-field controllable assembly, the magnetic-field controllable assembly is capable of changing its own magnetic field strength and magnetic pole direction, such that the first magnetic assembly and the second magnetic assembly are connected with one another due to magnetic attraction, and the first magnetic assembly and the second magnetic assembly are separated from one another due to magnetic repulsion;
wherein the magnetic-field controllable assembly comprises a charging module, a controller is provided within the body, the controller being electrically connected with the charging module;
wherein an elastomeric seal is provided within the body, the elastomeric seal being located between attracted connection surfaces of the first magnetic assembly and the second magnetic assembly when the body and the display screen portion are connected; and
wherein when the display device falls, the controller controls the charging module to reduce strength of an output current, such that deformation of the elastomeric seal, which is resulted from press by the first magnetic assembly and the second magnetic assembly, reduces, and when the display device decelerates or touches the ground, the elastomeric seal is further compressed to play a buffering role and realize the anti-falling effect.

2. The display device according to claim 1, wherein magnetic poles of the first magnetic assembly are arranged to be opposite to magnetic poles of the second magnetic assembly.

3. The display device according to claim 2, wherein the magnetic-field controllable assembly comprises:
a ferromagnetic core disposed around a set axis, the set axis being perpendicular to a display surface of the display screen portion when the body and the display screen portion are connected;
a coil annularly attached to the ferromagnetic core with the set axis as an axis; and
the charging module including a charging circuit, electrically connected with the coil, configured to provide the coil with a first current or a second current, wherein current directions of the first current and the second current are opposite.

4. The display device according to claim 3,
wherein the controller is configured to control the charging module to output the first current or the second current.

5. The display device according to claim 4, wherein the first magnetic assembly is the magnetic-field controllable assembly, and the second magnetic assembly comprises a permanent magnet.

6. The display device according to claim 5, wherein the body comprises a frame, the ferromagnetic core and the coil being disposed along an inner wall of the frame.

7. The display device according to claim 5, wherein the permanent magnet is disposed on a side of the display screen portion facing the body, and the permanent magnet is disposed around the set axis.

8. The display device according to claim 1, wherein a motion sensor is provided within the body, the motion sensor being configured to detect a motion parameter of the display device along a vertical direction.

9. The display device according to claim 8, wherein the controller is electrically connected with the motion sensor, and in response to that the motion parameter along the vertical direction, which is detected by the motion sensor, rises to a preset threshold, the controller is configured to control the charging module to reduce an intensity of an output current of the charging module, wherein the reduced intensity of the output current is sufficient to ensure the connection between the body and the display screen portion.

10. The display device according to claim 4, further comprising a movable connecting arm, wherein one end of the movable connecting arm is disposed within the body, and the other end of the movable connecting arm is connected with the display screen portion.

11. The display device according to claim 10, wherein the controller is electrically connected with the movable connecting arm, and the controller is configured to control the movable connecting arm to drive the display screen portion to eject from the body, in response to an operation triggering separation between the display screen portion and the body;
the controller is further configured to control the movable connecting arm to drive the display screen portion to retract to the body, in response to an operation triggering connection between the display screen portion and the body.

12. The display device according to claim 10, further comprising a motion sensor configured to detect a motion parameter of the body,
wherein the controller is electrically connected with the motion sensor, and when the display screen portion mutually repels with the body, the controller is configured to, in response to a motion amplitude and a motion frequency of the body being within respective preset threshold ranges, control, according to the motion parameter detected by the motion sensor, the movable connecting arm to drive the display screen portion to move backwards relative to the body, such that the display screen portion is disposed within a preset region.

13. The display device according to claim 12, wherein the motion sensor is configured to detect the motion parameter of the body in each of six degrees of freedom of motion;
   with the end of the movable connecting arm connected with the display screen portion as a reference, the end of the movable connecting arm disposed within the body has six degrees of freedom of motion.

14. The display device according to claim 4, wherein the display screen portion further comprises:
   a data transceiver, communicatively connected with the controller, configured to receive display information sent by the controller to control the display screen portion to display a preset image; and
   a first power supply, configured to supply power for the display screen portion and the data transceiver.

15. The display device according to claim 14, wherein the body further comprises a second power supply configured to charge the first power supply.

16. The display device according to claim 15, wherein the first power supply mates with the second power supply through wireless charging.

17. The display device according to claim 10, wherein the display device is provided with at least two movable connecting arms, and joints of the movable connecting arms and the display screen portion are evenly distributed on one side of the display screen portion facing an interior of the body.

18. The display device according to claim 14, wherein when the display screen portion is separated from the body and a battery capacity of the first power supply is lower than a preset threshold, the display screen portion displays a connection prompt.

* * * * *